United States Patent

[11] 3,576,189

[72] Inventors Walter Lorenz
Kahl/Main;
Ernst Munz, Niederrodenbach; Dieter Nowak, Dahl/Main; Friedrich Ploger, Kleinostheim; Horst Roepenack, Bruchkobel, Germany
[21] Appl. No. 806,117
[22] Filed Mar. 11, 1969
[45] Patented Apr. 27, 1971
[73] Assignee NUKEM, Nuklear-Chemie und-Metallurgie Gesellschaft mit beschrankter Haftung Wolfgang near Hanau am Main, Germany
[32] Priority Mar. 16, 1968
[33] Germany
[31] P 15 56 753.0

[54] APPARATUS FOR MOVING, WASHING, DRYING, INSPECTING AND PACKAGING CENTERLESS GROUND CERAMIC BODIES
3 Claims, 6 Drawing Figs.

[52] U.S. Cl. ................................................. 134/62,
51/5, 51/103, 134/63, 134/68, 134/125, 134/131, 198/33

[51] Int. Cl. ..................................................... B08b 3/02, B24b 5/22
[50] Field of Search .......................................... 134/62, 63, 68, 72, 83, 125, 126, 131; 118/322; 15/88

[56] References Cited
UNITED STATES PATENTS
2,531,009  11/1950  Stuart et al. .................  15/88X
2,579,737  12/1951  Giordano ....................  118/322X
2,677,248  5/1954  Rexford et al. ..............  134/68X Primary Examiner—Daniel Blum
Attorneys—Francis D. Stephens and Hugo Huettig, Jr.

ABSTRACT: Centerless ground ceramic bodies for fuel rods are mechanically conveyed from a centerless grinder through the steps of washing, drying, inspecting and packaging. The apparatus eliminates additional manual operation, does not damage the bodies and is economical.

INVENTORS
Walter Lorenz
Ernst Münz
Dieter Nowak
Friedrich Plöger
Horst Roepenack

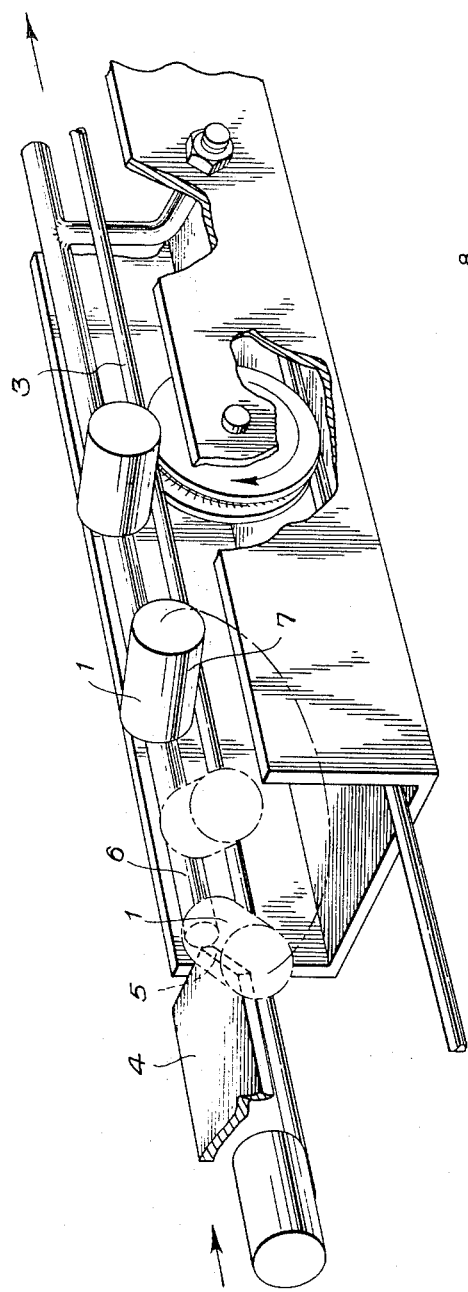
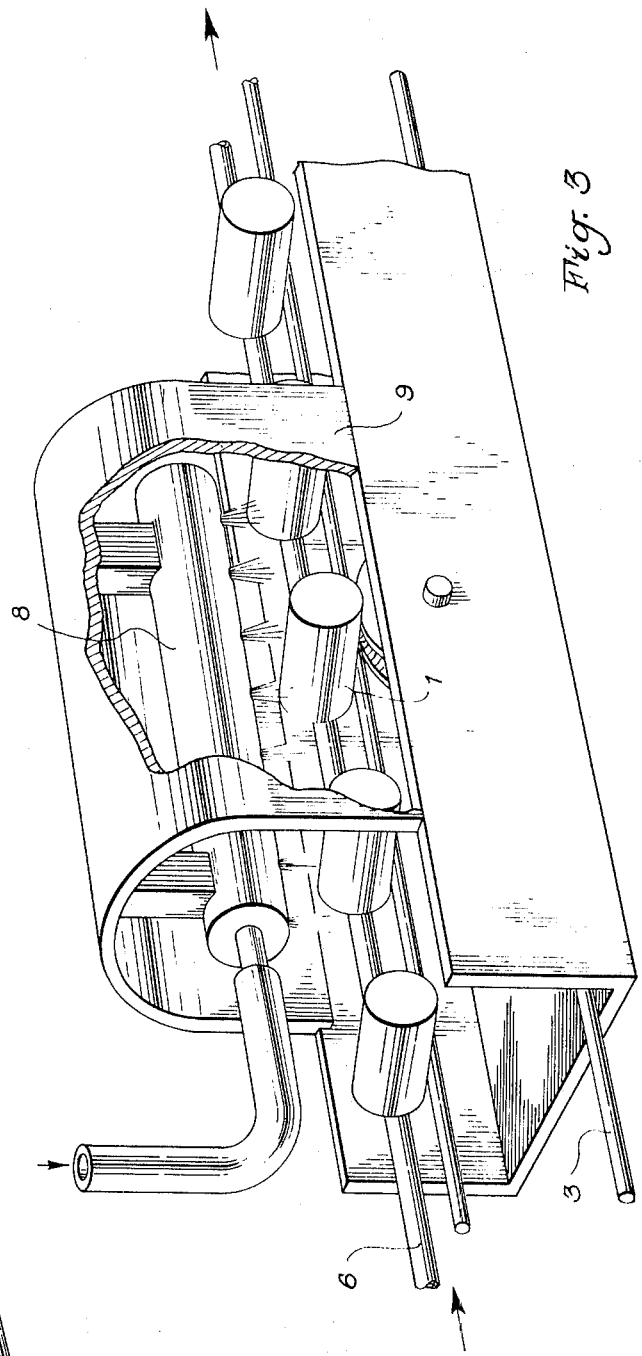

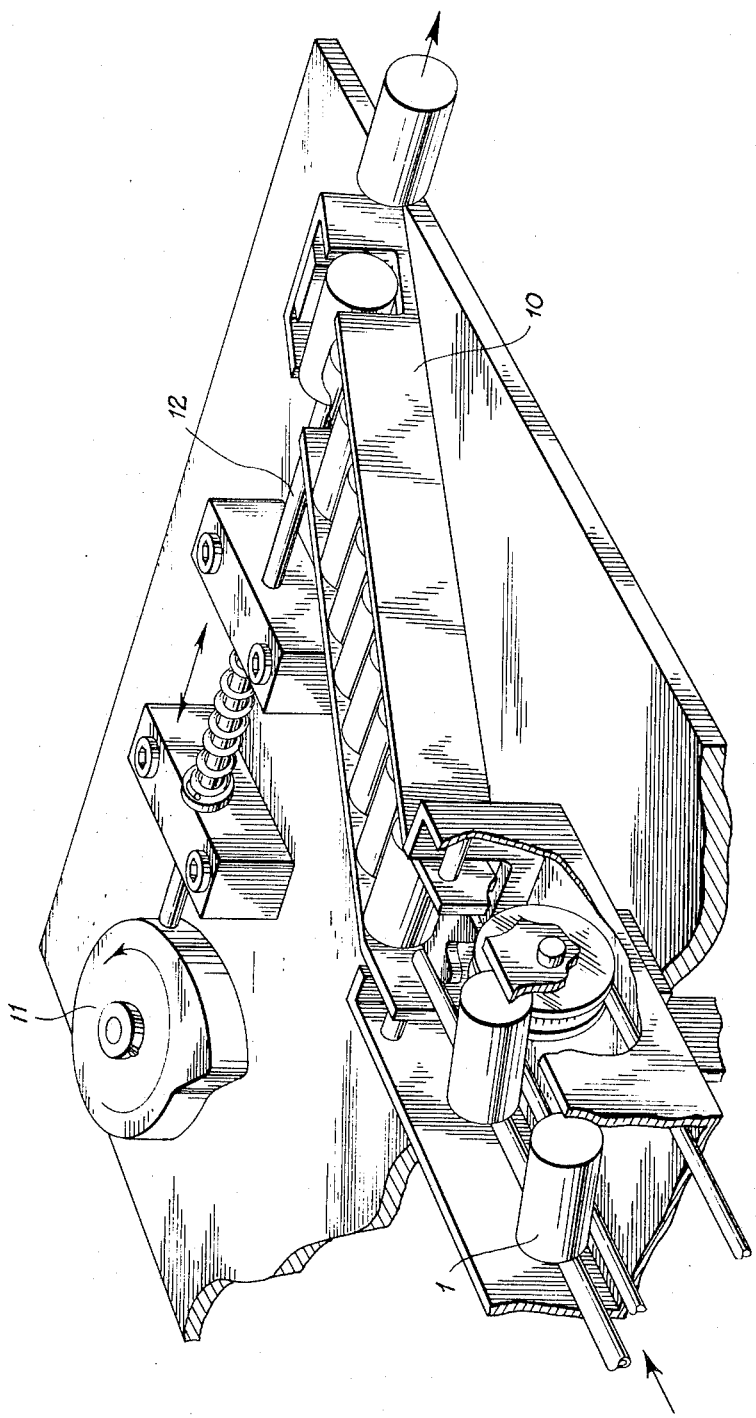

INVENTORS
Walter Lorenz
Ernst Münz
Dieter Nowak
Friedrich Plöger
Horst Roepenack

APPARATUS FOR MOVING, WASHING, DRYING, INSPECTING AND PACKAGING CENTERLESS GROUND CERAMIC BODIES

This invention relates to the preparation of cylindrical sintered ceramic bodies for fuel and breeding elements in reactors. Cylindrical sintered bodies are the preferred form for fuel and breeding elements used in a majority of present-day core reactors. These cylindrical bodies are placed in jackets and are enclosed in the same. These bodies have a customary quality requirement for very narrow or tight diameter tolerances and surfaces which are free from impurities, such as grinding dust, and are undamaged. Since these ceramic bodies are mechanically very sensitive to damage, it is necessary that they are handled very carefully during and after being processed.

Heretofore it has been generally customary to remove the sintered bodies after they have been centerlessly ground by hand or by means of inclined angular members onto which the bodies are pushed. Such procedure has the disadvantages in that at least two workers are required for the grinding machine and also that the grinding dust adhering to the surfaces of the sintered bodies is difficult to remove if it is not immediately cleaned off by spray jets. Consequently, the bodies have been cleaned by means of ultrasonic waves or by steam which is used quite often and followed by a drying step before the sintered bodies are visually inspected.

The above numerous individual operation steps have an additional danger in that pieces break off the bodies and the damaged bodies must be rejected.

The object of this invention is to produce an apparatus which can mechanically perform the above-required steps without damaging the bodies and without additional manual operation and which is economical.

In general, these objects are obtained by collecting the bodies on an endless conveyor belt after they leave the centerless cylindrical grinding machine and then while on the belt turning the bodies 90°, conveying the bodies further along by the conveyor belt to be washed, and finally automatically putting the bodies onto a receiving plate by means of a piston.

The means by which the objects of this invention are obtained are described more fully with reference to the accompanying perspective drawings which, when joined together, form a continuous series of units and in which:

FIG. 2 shows the turning of the bodies 90°;

FIG. 3 shows the washing of the bodies;

FIG. 4 shows the ejection of the bodies from the conveyor belt;

Figure 1:
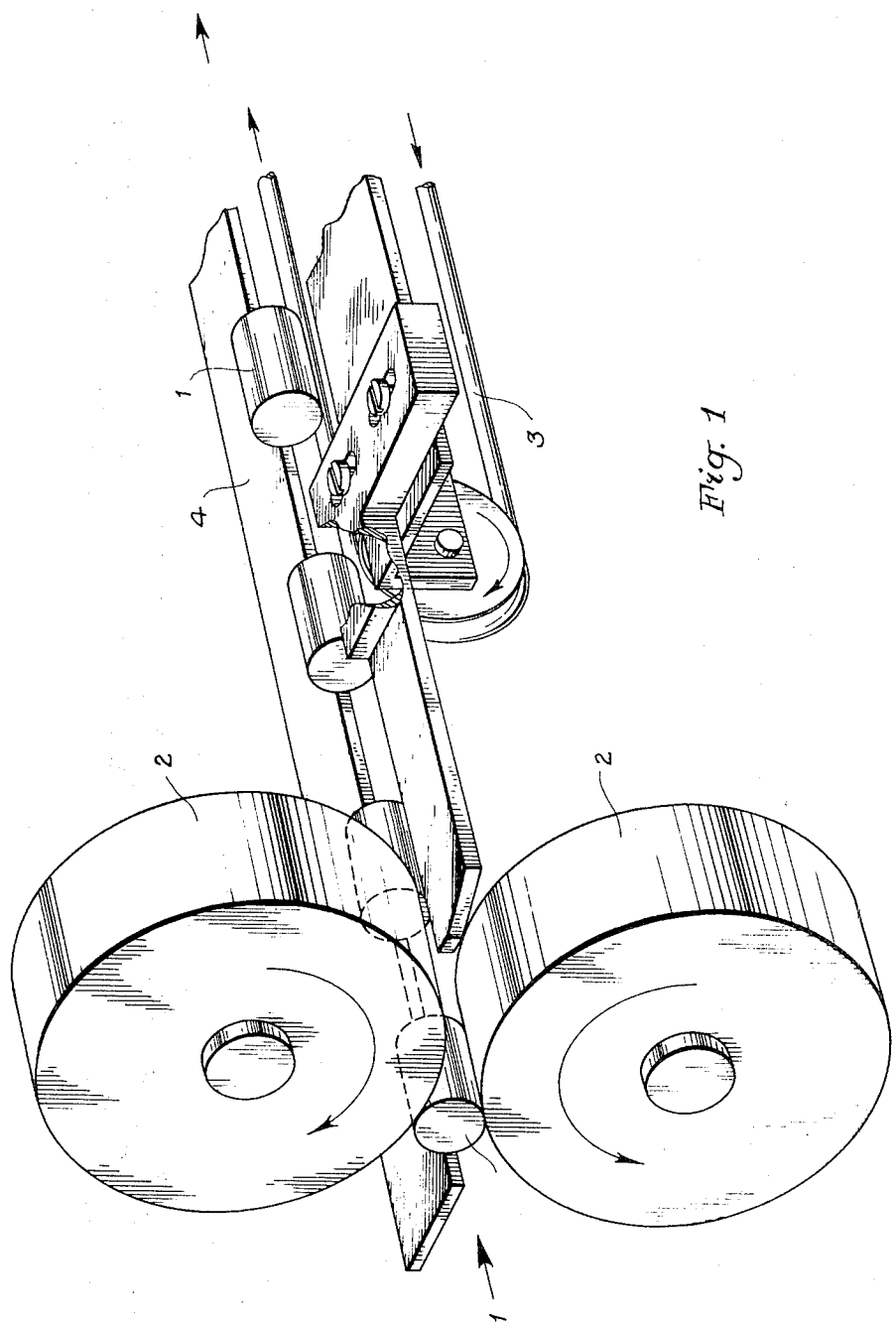
FIG. 1 shows the sintered ceramic bodies being received on a conveyor belt as they leave a centerless grinding machine.

As shown in FIG. 1, the sintered bodies 1 which have been ground between the grinding wheels 2 of a centerless cylindrical grinding machine are placed on an endless conveyor belt 3. There the bodies 1 have their longitudinal axes lying in the same direction as the movement of belt 3 and are held on belt 3 by the grinding ruler 4.

In FIG. 2, the bodies are turned 90°, in other words, sidewise, by the beveled end 5 of the grinding ruler 4 and thus contact the stationary guide rail 6. In this position, the bodies have their circular circumferential surfaces 7 rolling on belt 3 while sidewise sliding is prevented by guide rail 6.

In FIG. 3, the bodies 1 are shown rolling on the belt through a washer where they are washed by fine water jets. The water jets come from pipe 8 which is mounted within protective housing 9.

The rolling bodies, as shown in FIG. 4, then pass with their cylindrical surfaces in contact with one another into an inclined chute 10 from which they are removed by a piston 12 actuated by a cam 11.

Figure 5:
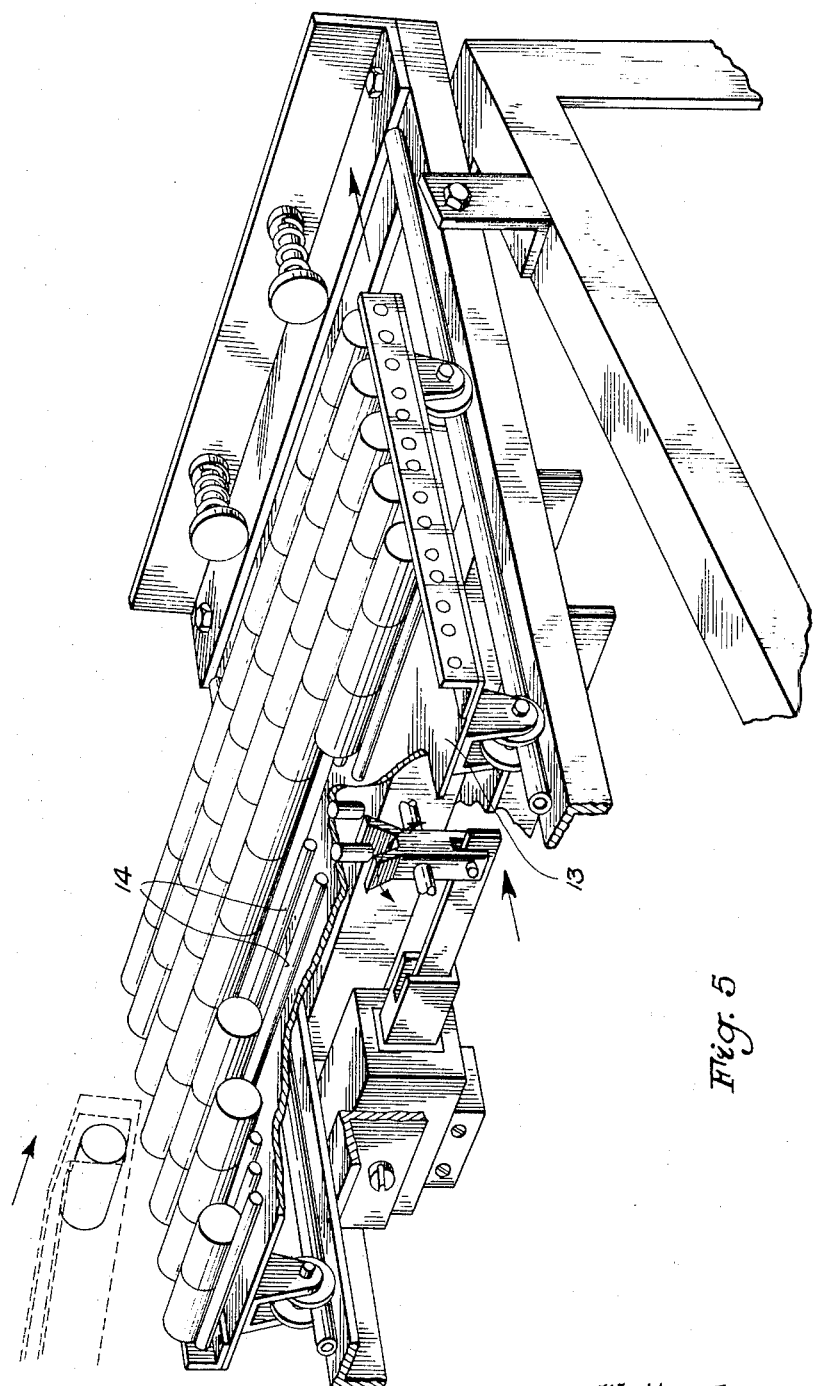
FIG. 5 shows the bodies being collected upon a collecting plate.

The removed bodies, as shown in FIG. 5, are thus pushed onto a plate 13 with roller bars 14. After drying with hot air the bodies can be easily inspected by means of turning said roller bars; damaged bodies are removed.

Figure 6:
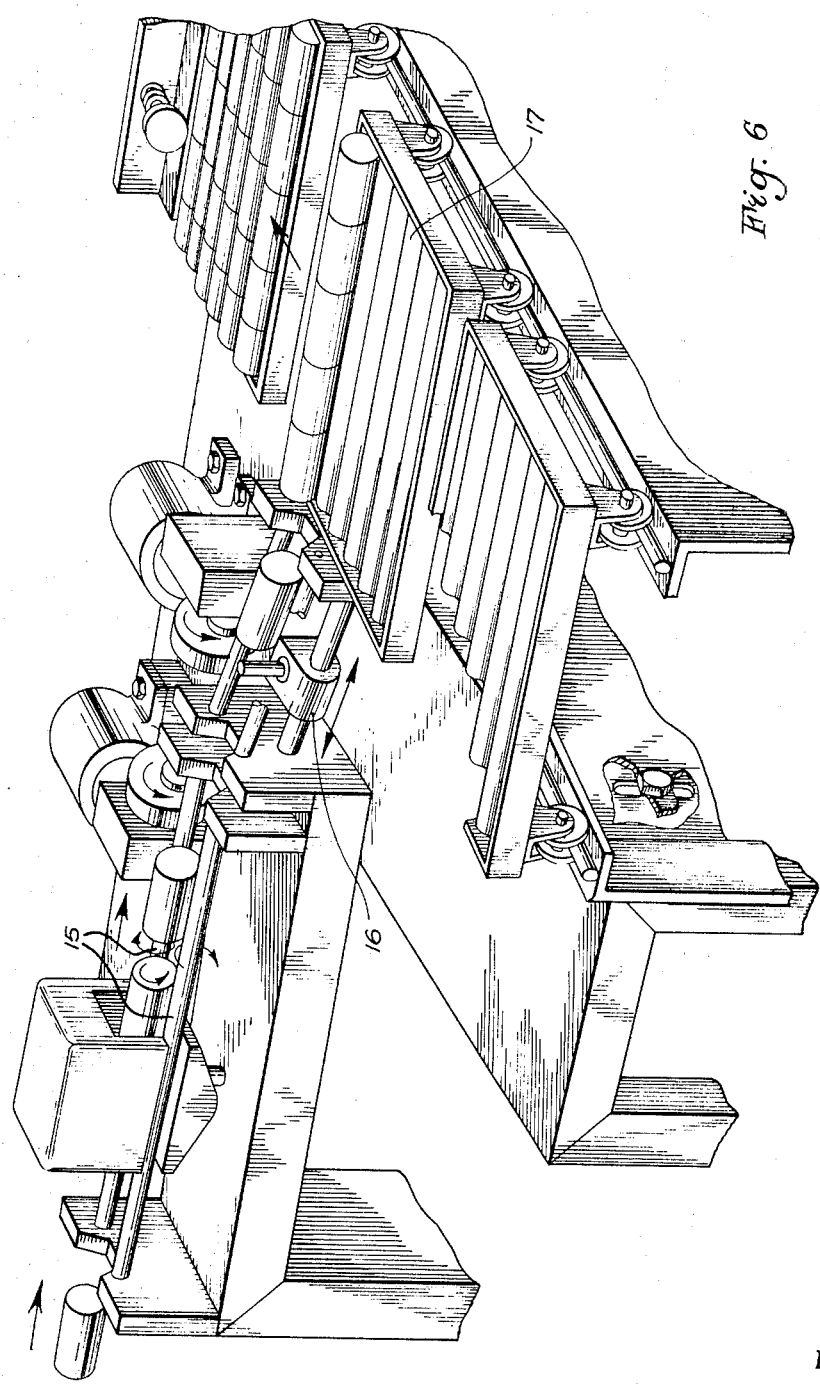
FIG. 6 shows a modified form of FIGS. 4 and 5.

The unit shown in FIG. 6 can be used with the unit shown in FIG. 4 for removing the bodies by means of a piston. As shown in FIG. 6, the sintered bodies are pushed onto roller bars 15 which rotate the bodies in the same direction and the bodies are here dried with hot air and inspected. The bodies are now moved from the roller bars by means of a reciprocating pushing device 16 and are pushed onto a plate 17 which has a corrugated bottom so that it can receive rows of the bodies. These plates or trays can be used for transporting the bodies for being directly inserted into shipping containers.

The apparatus of this invention has the advantage that all of the process steps and treatment are accomplished automatically without manual aid so that the process is economical and, in addition, the process has technical advantages for the production of cylindrical bodies which are used in great quantities for the production of fuel elements.

Having now described the means by which the objects of this invention are obtained,

We claim:

1. In an apparatus for removing, washing, drying, inspecting and packing centerless cylindrically ground cylindrical ceramic bodies each having a longitudinal axis and a circumferential surface comprising conveyor belt means (3) for receiving the centerless ground bodies and moving them in the direction of said longitudinal axis, grinding ruler means (4) for guiding said bodies on said belt, turning means (5) for turning said bodies 90° on said belt to roll said bodies on their cylindrical circumferences on said belt, and means for washing the rolling bodies.

2. An apparatus as in claim 1, further comprising inclined receptacle means (10) for receiving said bodies from said belt, and piston means (12) for pushing said bodies off of said belt at a right angle thereto, and plate means (13) for receiving said pushed bodies for being sorted and dried.

3. An apparatus as in claim 2, further comprising roller bar means (15) between said piston means and plate means for moving said bodies as they are dried and inspected, and pusher means for moving said bodies from said roller bar means onto a plate means (17).